United States Patent
Welsh

(10) Patent No.: US 8,920,125 B2
(45) Date of Patent: Dec. 30, 2014

(54) DUAL FREQUENCY HUB MOUNTED VIBRATION SUPPRESSOR SYSTEM

(71) Applicant: Sikorsky Aircraft Corporation, Stratford, CT (US)

(72) Inventor: William A. Welsh, North Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 13/774,011

(22) Filed: Feb. 22, 2013

(65) Prior Publication Data

US 2013/0164132 A1  Jun. 27, 2013

Related U.S. Application Data

(62) Division of application No. 12/353,217, filed on Jan. 13, 2009, now Pat. No. 8,403,643.

(60) Provisional application No. 61/070,097, filed on Mar. 20, 2008.

(51) Int. Cl.
| | |
|---|---|
| *B64C 27/00* | (2006.01) |
| *H02K 7/14* | (2006.01) |
| *H02P 5/52* | (2006.01) |
| *F01D 5/02* | (2006.01) |
| *F16F 15/22* | (2006.01) |
| *H02K 41/025* | (2006.01) |
| *G01M 1/36* | (2006.01) |
| *F16F 7/10* | (2006.01) |
| *H02K 7/04* | (2006.01) |
| *H02K 16/02* | (2006.01) |

(52) U.S. Cl.
CPC ............... *B64C 27/001* (2013.01); *H02K 7/04* (2013.01); *H02K 7/14* (2013.01); *H02P 5/526* (2013.01); *H02K 16/02* (2013.01); *F01D 5/02* (2013.01); *F16F 15/223* (2013.01); *H02K 41/025* (2013.01); *G01M 1/36* (2013.01); *B64C 2027/003* (2013.01); *F16F 7/1011* (2013.01)
USPC .............................. 416/145; 74/574.1; 310/81

(58) Field of Classification Search
USPC ................... 310/156.32, 51, 81; 73/470, 672; 416/145; 74/574.1, 574.2, 61; 173/49; 700/280
See application file for complete search history.

(56) References Cited

U.S. PATENT DOCUMENTS

| | | |
|---|---|---|
| 2,664,763 A | 1/1954 | Gilles |
| 3,219,120 A | 11/1965 | Hooper |

(Continued)

FOREIGN PATENT DOCUMENTS

JP  61164109  7/1986

OTHER PUBLICATIONS

Kayler, Kimberly. "LORD Corporation's Technology to be Presented at American Helicopter Society's Annual Forum 67." Apr. 28, 2011. Retrieved from <http://www.lord.com/News-Center/News-Stories/LORD-Technology-Presented-at-American-Helicopter-Societys-Annual-Forum-67.xml>.

(Continued)

*Primary Examiner* — Tien Dinh
*Assistant Examiner* — Michael Kreiner
(74) *Attorney, Agent, or Firm* — Carlson, Gaskey & Olds P.C.

(57) ABSTRACT

A vibration suppressor system includes an annular electric motor system which independently controls rotation of at least two masses about the axis of rotation to reduce in-plane vibration of the rotating system. A method of reducing vibrations in a rotary-wing aircraft includes independently controlling a relative angular position of a multiple of independently rotatable masses to reduce vibrations of a main rotor system.

12 Claims, 18 Drawing Sheets

(56) References Cited

U.S. PATENT DOCUMENTS

| | | |
|---|---|---|
| 3,538,469 A | 11/1970 | Little et al. |
| 4,218,187 A | 8/1980 | Madden |
| 4,326,158 A | 4/1982 | Helgesen |
| 4,728,837 A * | 3/1988 | Bhadra .................. 310/80 |
| 4,901,573 A | 2/1990 | Srinivasan et al. |
| 4,951,514 A | 8/1990 | Gubin |
| 4,953,098 A | 8/1990 | Fischer, Jr. et al. |
| 5,310,137 A | 5/1994 | Yoerkie, Jr. et al. |
| 5,372,478 A | 12/1994 | McCafferty |
| 5,497,861 A | 3/1996 | Brotz |
| 5,553,514 A | 9/1996 | Walkowc |
| 5,586,505 A | 12/1996 | Berdut |
| 5,676,025 A | 10/1997 | Lulay |
| 5,757,662 A | 5/1998 | Dyer et al. |
| 5,831,354 A | 11/1998 | Stopplecamp |
| 6,210,099 B1 | 4/2001 | Hugbart et al. |
| 6,236,934 B1 | 5/2001 | Dyer et al. |
| 6,568,291 B1 | 5/2003 | Inman |
| 6,907,800 B1 | 6/2005 | Inman |
| 7,047,109 B2 | 5/2006 | Ogura et al. |
| 7,267,029 B2 | 9/2007 | Altieri |
| 7,350,749 B2 | 4/2008 | Heaven et al. |
| 7,492,074 B1 | 2/2009 | Rittenhouse |
| 7,722,322 B2 | 5/2010 | Altieri et al. |
| 7,942,633 B2 | 5/2011 | Jolly et al. |
| 7,958,801 B2 | 6/2011 | Frederickson |
| 2001/0035068 A1 | 11/2001 | Case et al. |
| 2005/0079056 A1 | 4/2005 | Welsh |
| 2006/0083617 A1 * | 4/2006 | Jolly et al. ............. 416/133 |
| 2009/0116963 A1 | 5/2009 | Welsh |
| 2009/0180882 A1 | 7/2009 | Stille |

OTHER PUBLICATIONS

Anonymous. "Carolina Transparency: Dual Frequency Hub-Mounted Vibration Suppressor." Date unknown. Retrieved from <http://www.carolinatransparency.com/earmarks/popup.php?id=62098>. Retrieved Sep. 21, 2011.

Kayler, Kimberly. "LORD Selected to Team with Sikorsky for Hub-Mounted Vibration." Jan. 29, 2009. Retrieved from <http://www.lord.com/News-Center/Press-Releases/LORD-Selected-to-Team-with-Sikorsky-for-Hub-Mounted-Vibration-Suppression-(HMVS).xml>.

* cited by examiner

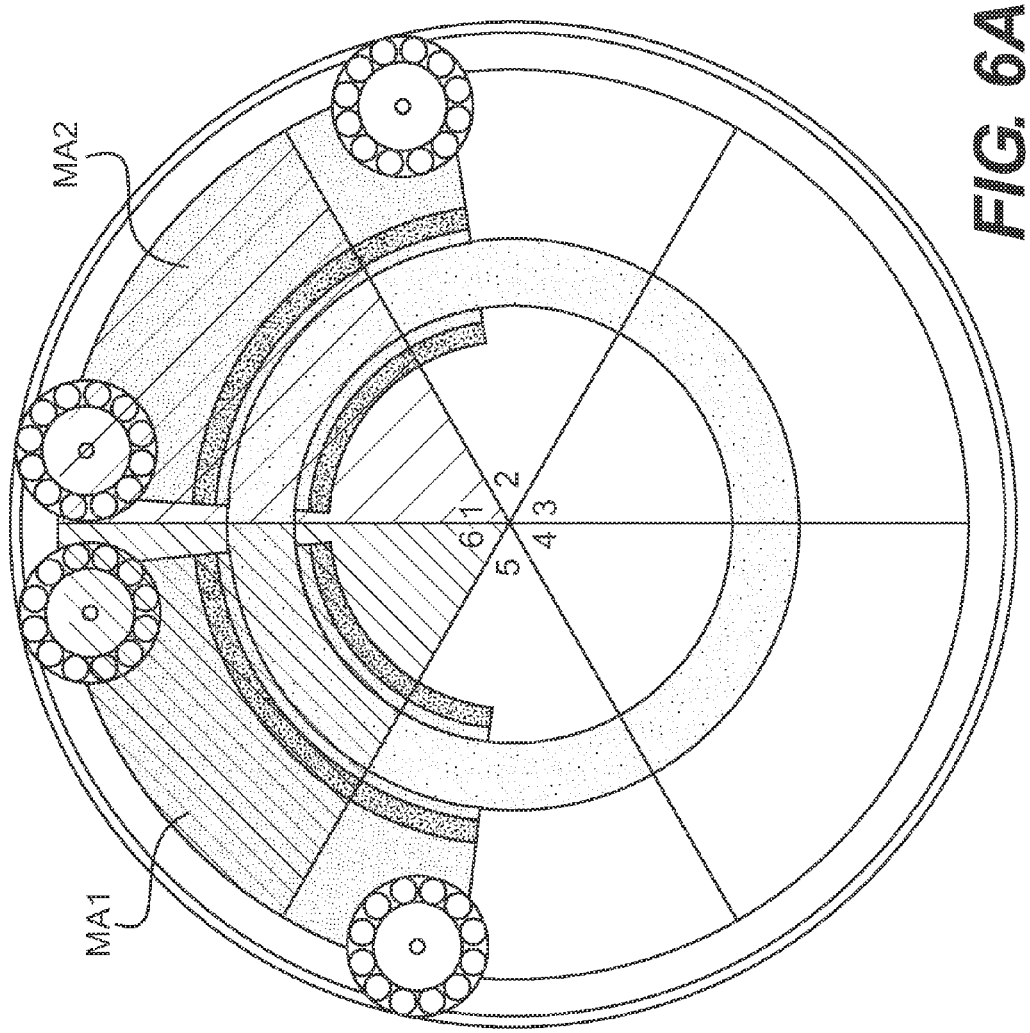

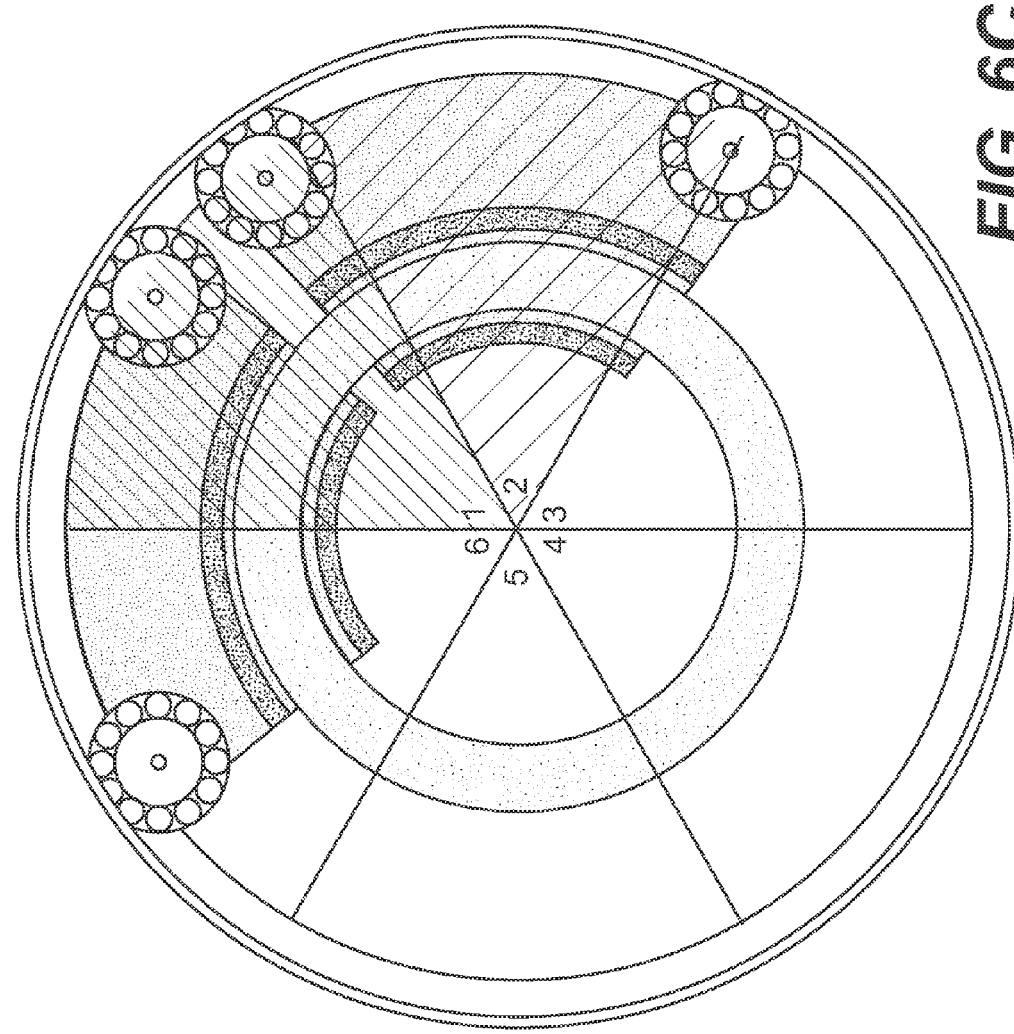

DUAL FREQUENCY HUB MOUNTED VIBRATION SUPPRESSOR SYSTEM

RELATED APPLICATIONS

The present application is a divisional of prior U.S. patent application Ser. No. 12/353,217, filed Jan. 13, 2009, which claims the benefit U.S. Provisional Application No. 61/070,097, filed Mar. 20, 2008. The '217 and '097 applications are herein incorporated by reference in their entirety.

BACKGROUND

The present disclosure relates to a vibration suppressor system.

Vibration suppression is often utilized to null vibrations associated with a rotating system. Such vibrations, when left unattenuated may lead to crew and structural fatigue and premature failure of system components. The vibrations may also be transmitted through adjacent support structure to other areas and systems remote from the vibration source. Consequently, it may be desirable to suppress these vibrations proximal the vibration source.

One application which exemplifies vibration isolation/absorption is the main rotor system of a rotary-wing aircraft. Typically, the main rotor system includes a hub system which drives a plurality of rotor blades subject to a variety of aerodynamic and gyroscopic loads. For example, as each rotor blade advances or retreats relative to the freestream airflow, each rotor blade experiences a rise and fall of in-plane aerodynamic drag. Furthermore, as the tip of each rotor blade advances with each revolution of the rotor system, the relative velocity at the blade tip may approach supersonic Mach numbers. As such, variations may occur at various coefficients which define blade performance (e.g., moment, lift and drag coefficients). Moreover, gyroscopic and Coriolis forces are generated which may cause the blades to "lead" or "lag." These effects, as well as others, generate vibrations, which, if not suppressed, are transmitted to the airframe, typically through the main rotor gearbox mount structure.

Various vibration suppressor systems have been devised to suppress vibrations. Mast-mounted vibration isolators suppress or isolate in-plane vibrations at a location proximal to the source. Transmission, cabin or cockpit absorbers reduce vibrations at a location remote from the source.

Mast-mounted vibration isolators having a plurality of resilient arms (i.e., springs) extend in a spaced-apart spiral pattern between a hub attachment fitting and a ring-shaped inertial mass. Several pairs of spiral springs are mounted to and equiangularly arranged with respect to both the hub attachment fitting and the inertial mass so as to produce substantially symmetric spring stiffness in an in-plane direction. The spring-mass system, i.e., spiral springs in combination with the ring-shaped mass, is tuned in the non-rotating system to a frequency equal to N*rotor RPM (e.g., 4P for a four-bladed rotor) at normal operating speed, so that in the rotating system the spring mass system will respond to both N+1 and N−1 frequency vibrations (i.e., 3P and 5P for a four-bladed rotor). N is the number of rotor blades.

While the spiral spring arrangement produces a relatively small width dimension (i.e., the spiraling of the springs increases the effective spring rate), the height dimension of each vibration isolator is increased to react out-of-plane loads via upper and lower pairs of spiral springs. This increased profile dimension increases the profile area, and consequently the profile drag produced by the isolator. The spiral springs must also be manufactured to relatively precise tolerances to obtain the relatively exact spring rates necessary for efficient operation. As such, manufacturing costs may be significant. Additionally, the weight of this device is very high, thus reducing the useful payload of the helicopter. Furthermore, these vibration isolators are passive devices which are tuned to a predetermined in-plane frequency and cannot be adjusted in-flight to isolate in-plane loads which may vary in frequency depending upon flight regime.

Yet another general configuration of a mast-mounted vibration isolator is referred to as a "bifilar." Bifilars include a hub attachment fitting connected to and driven by the rotor-shaft with a plurality of radial arms which project outwardly from the fitting with a mass coupled to the end of each arm via a rolling pin arrangement. A pin rolls within a cycloidally-shaped bushing to permit edgewise motion of each mass relative to its respective arm. The geometry of the pin arrangement in combination with the centrifugal forces acting on the mass (imposed by rotation of the bifilar) results in an edgewise anti-vibration force at a 4 per revolution frequency which is out-of-phase with the large 4 per revolution ("4P") in-plane vibrations of the rotor hub for a 4 bladed rotor system. The frequency of 4P is the frequency as observed in a nonrotating reference system such as the airframe.

Pairs of opposed masses act in unison to produce forces which counteract forces active on the rotor hub. For the masses to produce the necessary shear forces to react the in-plane vibratory loads of the rotor system, counteracting bending moments are also produced. These force couples may impose relatively large edgewise bending loads in the radial arms, and consequently, the geometry thereof must produce the necessary stiffness (EI) at the root end of the arms. As such, these increased stiffness requirements result in relatively large and heavy bifilar arms.

While the bifilar system has proven effective and reliable, the weight of the system, nearly 210 lbs for one typical system, may be detrimental to the overall lifting capacity of the aircraft. Furthermore, the pin mount for coupling each mass to the respective radial arm may require periodic removal and replacement, which may increase the Direct Maintenance Costs (DMC) of aircraft operations.

SUMMARY

A vibration suppressor according to an exemplary aspect of the present disclosure includes an annular electric motor system defined about an axis of rotation of a rotating system, and a control system in communication with the annular electric motor system to independently control rotation of at least two masses about the axis of rotation to reduce in-plane vibration of the rotating system.

A method of reducing vibrations in a rotary-wing aircraft main rotor system having N number of blades which rotate about an axis of rotation at a rotational speed of 1P such that the main rotor system produces NP vibrations according to an exemplary aspect of the present disclosure includes independently rotating a multiple of independently rotatable masses disposed about an axis of rotation defined by the main rotor system and controlling a relative angular position of the multiple of independently rotatable masses to reduce the NP vibrations of the main rotor system.

BRIEF DESCRIPTION OF THE DRAWINGS

The various features and advantages of this disclosure will become apparent to those skilled in the art from the following detailed description of the currently disclosed embodiment. The drawings that accompany the detailed description can be briefly described as follows:

FIGS. 6A-6E are schematic top views of a vibration suppressor system with segmental propulsion;

DETAILED DESCRIPTION OF THE DISCLOSED EMBODIMENT

Figure 1:
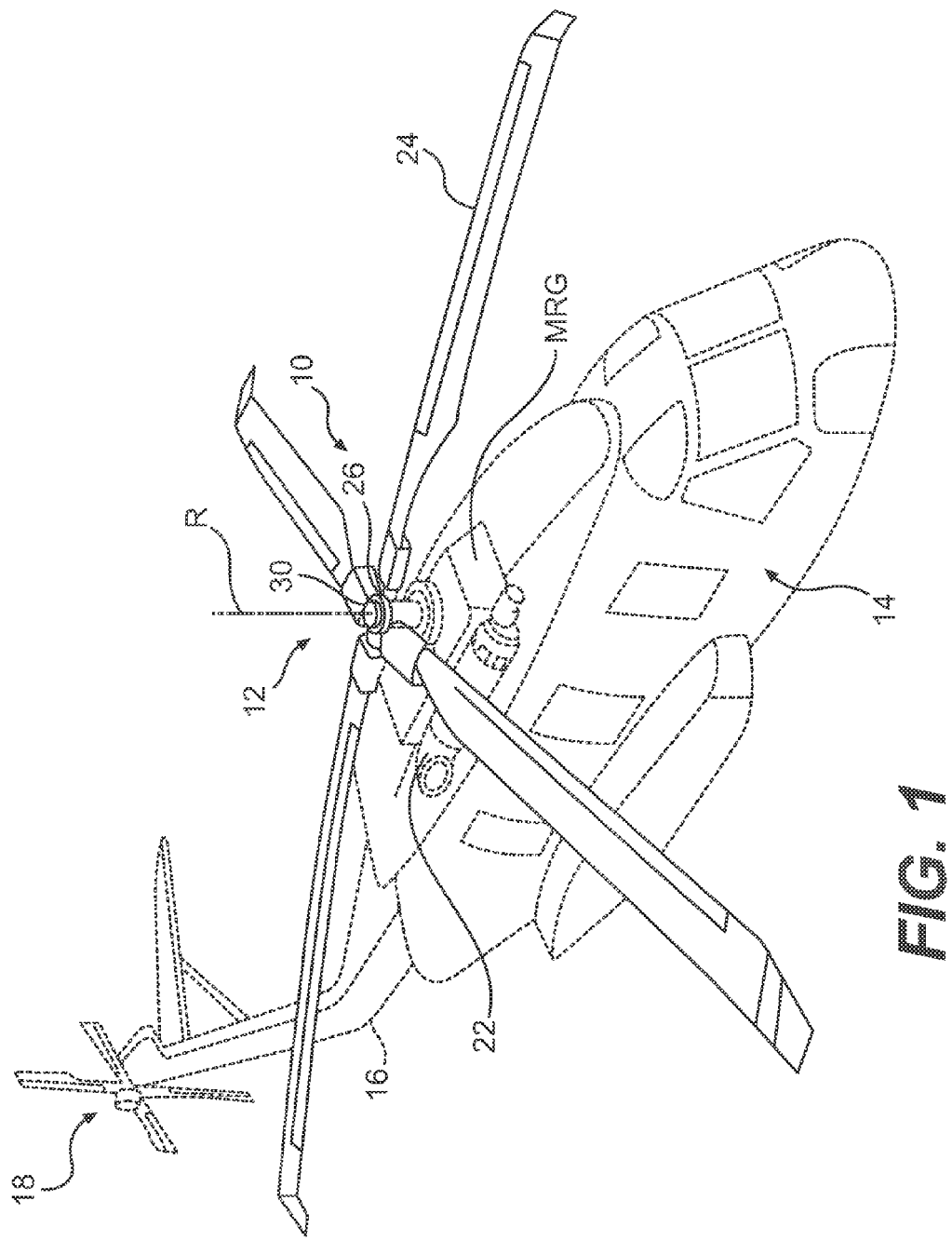
FIG. 1 is a general perspective view of an exemplary rotary wing aircraft embodiment for use with the present disclosure.

FIG. 1 schematically illustrates a rotary-wing aircraft 10 having a main rotor system 12. The aircraft 10 includes an airframe 14 having an extended tail 16 which mounts an anti-torque system such as a tail rotor system 18. The main rotor assembly 12 is driven about an axis of rotation R through a main rotor gearbox (illustrated schematically at MRG) which is powered by one or more engines E. The main rotor system 12 includes a multiple of rotor blades 20 mounted to a rotor hub 22. The rotor hub 22 is driven about the axis of rotation R by a main rotor shaft 24 which is driven by the main rotor gearbox MRG. Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit herefrom.

A vibration suppressor system 30 is mounted to the main rotor system 12 for rotation therewith and may thereby be referred to as a hub mounted vibration suppressor (HMVS). Vibratory forces active on the main rotor system 12 are generated by a variety of factors, although the dominant vibrations originate from aerodynamic and/or gyroscopic forces generated by each rotor blade 20.

A four bladed rotor system, for example, produces 3P vibratory loads, i.e., in a single revolution, the magnitude of the load vector varies from a minimum to a maximum value three times in the rotating frame of reference. The 3P vibratory loads resolve into 4P vibration in a non-rotating frame of reference such as the airframe 14 due to the addition of the 1P rotor rotational speed. In addition, 5P vibratory loads are produced in a direction opposite the rotational direction of the main rotor system. The 5P vibratory loads also resolve into 4P vibration in the non-rotating frame of reference due to the subtraction of the opposite 1P rotor rotational speed. While a variety of factors influence the vibratory spectrum of a rotor system, such vibrations are generally a result of each rotor blade experiencing maximum lift when advancing and minimum lift when retreating. In another example, a seven bladed rotor system—having 6P co-rotation and 8P counter-rotational vibratory load resolve into a 7P vibration in the non-rotating frame of reference such as the airframe 14.

Figure 2:
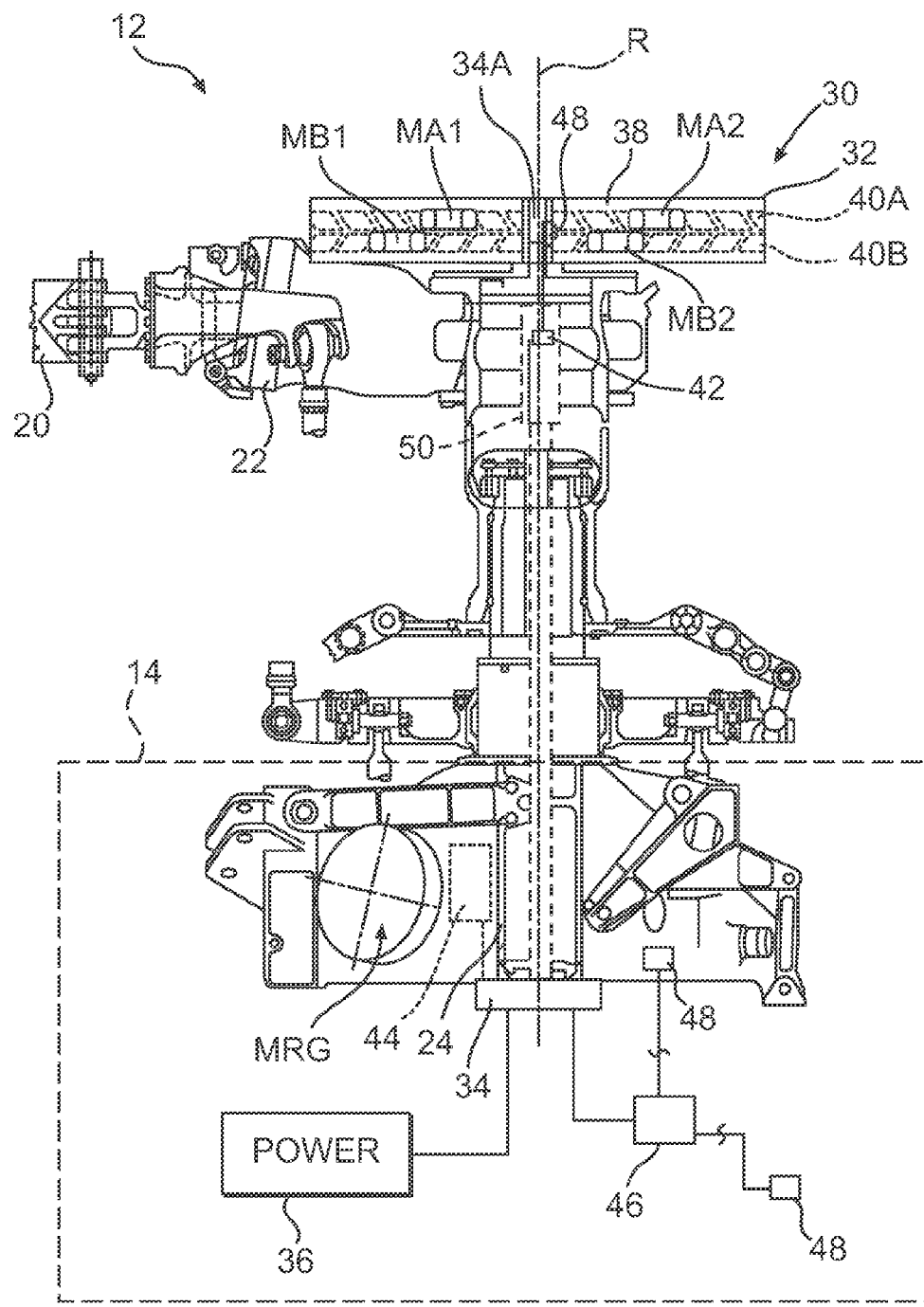
FIG. 2 is a side sectional view of a helicopter main rotor, including a main rotor shaft having a vibration suppression system mounted to the upper mast or shaft extension member of the main rotor system.

Referring to FIG. 2, the vibration suppressor system 30 generally includes an annular electric motor system 32, a control system 34 and a power system 36. The controller can be included in the electric motor system 32 i.e. it is typically in the rotating system) The annular electric motor system 32 may be contained within a housing 38 for rotation with the main rotor system 12. The annular electric motor system 32 in one non-limiting embodiment includes a first and second annular stator 40A, 40B mounted within the housing 38. Each stator 40A, 40B represents a primary analogous to a fixed portion of a linear electric motor. The first stator 40A is defined about the axis of rotation R to support a first set of masses MA1, MA2, which are independently rotatable about the first stator 40A (also illustrated in FIG. 3A). The second stator 40B is defined about the axis of rotation R to support a second set of masses MB1, MB2 which are independently rotatable about the second stator 40B (also illustrated in FIG. 3A). The first stator 40A may be located adjacent the second stator 40B in a stacked arrangement which facilitates a light weight and low profile arrangement which may be readily mounted atop the main rotor hub 22 within the housing 38.

Alternatively, the first stator 40A and second stator 40B may be located in the non-rotating system, i.e., in under the main rotor gearbox MRG. In this non-limiting embodiment, the MA1, MA2 would rotate at 4P and MB1 and MB2 would also rotate at 4P but in the opposite direction.

The control system 34 issues control signals to an amplifier 34A of the annular electric motor system 32 to control the rotational speed and relative angular position of the masses MA1, MA2, MB1, MB2 of the vibration suppressor system 30. The power system 36 in one non-limiting embodiment may be the aircraft electrical bus, which delivers electrical power created by a main rotor gearbox powered generator 44. The masses MA1, MA2, MB1, MB2 each represent an independent secondary analogous to a moving part of a linear electric motor. The control system 34 may include a speed sensor 42 which senses the instantaneous rotational speed 1P of the main rotor shaft 24 to control the rotational velocity and relative angular position of each of the masses the masses MA1, MA2, MB1, MB2.

Although the speed sensor 42 in one non-limiting embodiment may be a dedicated unit which directly measures the main rotor system 12 speed, the control system 34 may alternatively or additionally obtain the speed information from the generator 44 within the power system 36. The generator 44 turns at a predefined speed relative to the main rotor system 12 and may, in one non-limiting embodiment include a 5 kVa generator which provides a 115 volt, 400 Hz 3 phase potential to generate power for the vibration suppressor system 30 as well as provide the main rotor system speed reference signal. The generator 44 is mechanically driven by the MRG such that the rotational speed of the generator is a fixed multiple of the main rotor NP frequency. The electrical phase of the generator voltage is a fixed multiple of the generator rotational speed. Thus, the electrical voltage phase signal is a reflection of the NP frequency. As the rotor speed and NP frequency vary while in flight, the electrical voltage phase signal also varies and is perfectly slaved thereto, i.e. a fixed multiple of the main rotor speed. This makes the voltage signal an effective reference signal that will exactly track main rotor system speed. Hence, the control system 34 may use the phase information to issue the appropriate low power control signals to the amplifier 34A which issues high power signals to the vibration suppression system 30.

While the vibration suppressor system 30 may employ a control system 34 with a predefined schedule or model of the vibrations, e.g., at prescribed rotor speeds, another non-limiting embodiment utilizes a vibration sensing system 46 with at least one vibration feedback sensor 48 for issuing vibration signals indicative of the vibrations (e.g., amplitude, frequency and phase) at one or more locations within the fixed frame of reference, e.g., MRG, fuselage, cabin, or cockpit. It should be understood that the vibration sensing system 46 may alternatively be integrated within the control system 34. The control system 34 samples vibration levels at predefined intervals or rates to identify a trend—positive (lower vibration levels) or negative (larger vibration levels) such that as vibration levels change, the control system 34 issues modified control signals the vibration suppressor system 30 until a combination of rotational speed and angular position of the masses MA1, MA2, MB1, MB2 minimize vibratory loads in the main rotor system 12.

Power may be transferred from the stationary system to the rotating system via a slip ring 50 or the like. Only a small amount of additional weight is required inasmuch as the slip ring 50 is typically pre-existing in a rotary wing aircraft for other systems e.g., a rotor blade de-ice system. This slip ring 50 may also be used to communicate control signals when the control system 34 is mounted in the airframe 14 rather than on the main rotor system 12. Alternatively, the control system 34 may be located within the vibration suppressor system 30 such that the power system 36 communicates power to the slip ring 50 then to the control system 34.

Figure 3A:
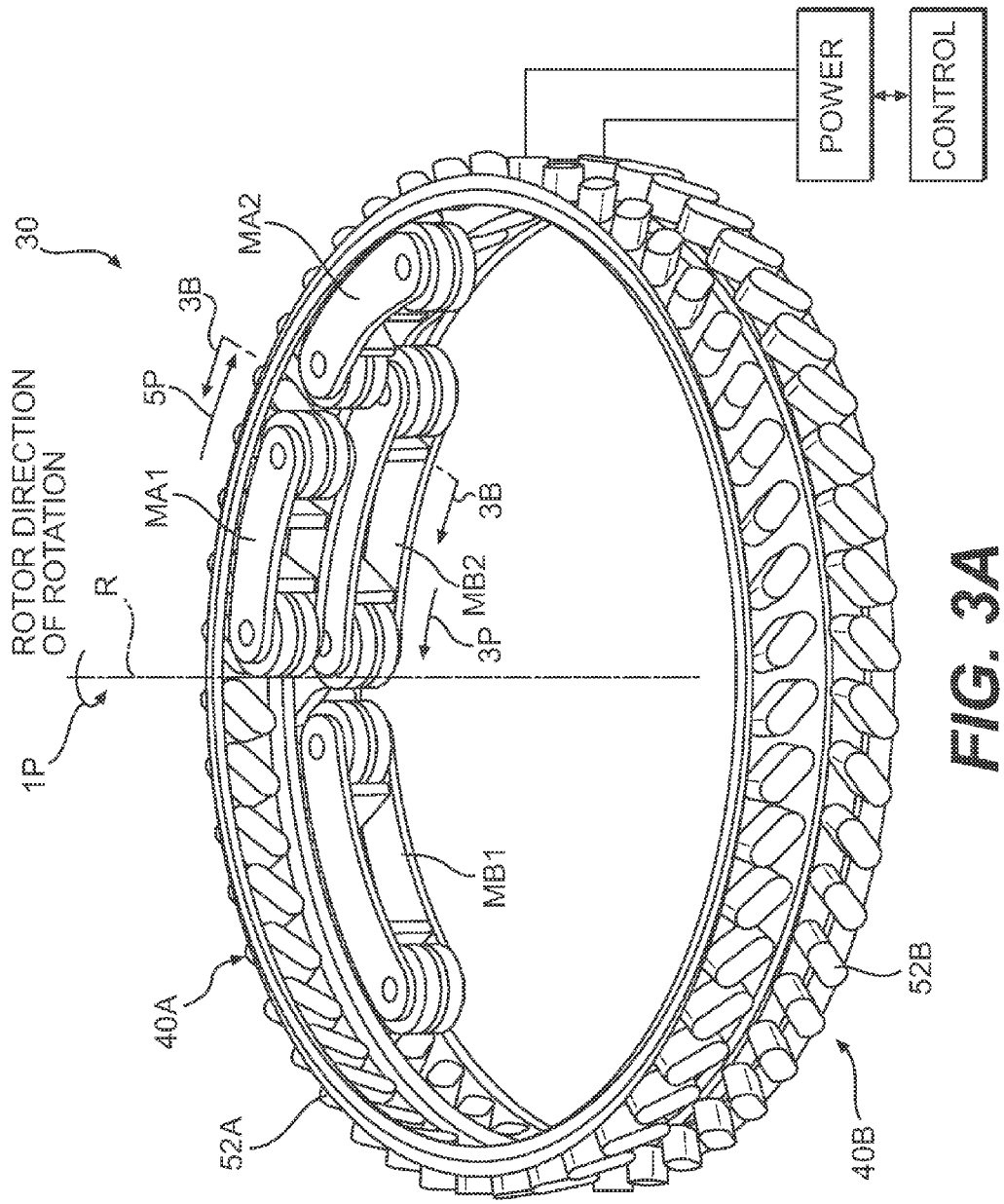
FIG. 3A is a schematic perspective view of a vibration suppressor system having adjacent annular stators.

Referring to FIG. 3A, one non-limiting embodiment of the vibration suppressor system 30 includes the first annular stator 40A, the second annular stator 40B with respective masses MA1, MA2 and MB1, MB2 which independently transit therein. The first annular stator 40A and the second annular stator 40B include a multitude of electro-magnets 52A, 52B arranged around each respective stator 40A, 40B. It should be understood that many different magnet configurations are possible, for example, a continuous iron portion with wire wound slots powered by the amplifier 34A. The multitude of electro-magnets 52A, 52B receive power from the amplifier 34A in response to the control system 34 to independently drive the masses MA1, MA2, MB1, MB2. Masses MA1, MA2 in this non-limiting embodiment operate to suppress 5P vibration such that for a rotor system 12 which operates at 1P of 4.3 Hz, the masses MA1, MA2 transit the first annular stator 40A at 21.5 Hz in a rotational direction opposite that of the main rotor system 12. Masses MB1, MB2 in this non-limiting embodiment operate to suppress 3P vibration such that for a rotor system 12 which operates at 1P of 4.3 Hz, the masses MB1, MB2 transit the second annular stator 40B at 12.9 Hz in a rotational direction the same as that of the main rotor system 12. It should be understood that this non-limiting embodiment is for a four-bladed main rotor system 12 and that other main rotor systems 12 as well as other rotational systems will also benefit therefrom.

As the first and second annular stator 40A, 40B are mounted to the main rotor system 12 for rotation therewith, the masses MA1, MA2, MB1, MB2 need only be driven at five revolutions per cycle of the rotor system (for masses MA1, MA2) and at three revolutions per cycle in the opposite direction (for masses MB1, MB2) to achieve the desired 4P frequency. That is, since the masses MA1, MA2, MB1, MB2 are, in the rotating reference system of the main rotor system 12 which rotates at one revolution per cycle (1P), the masses MA1, MA2, MB1, MB2 need only augment the rotational speed by the difference (3P+1P) to achieve the necessary 4P in the stationary reference system for masses MB1, MB2 which rotate in the direction of the rotor system 12 and 5P−1P to achieve the necessary 4P in the stationary reference system for masses MA1, MA2 which rotate in a direction opposite of the rotor system 12.

Figure 3B:
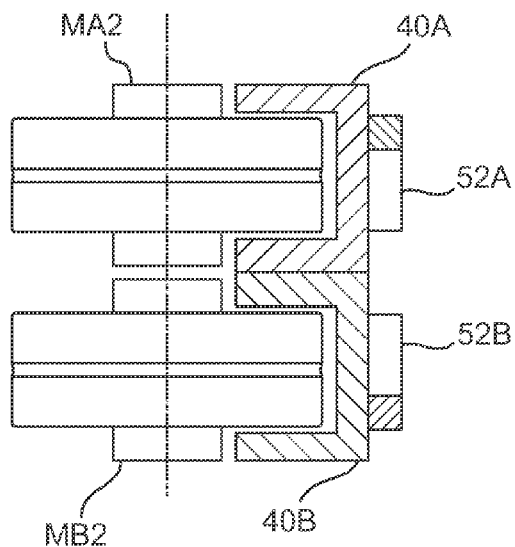
FIG. 3B is a sectional view through the system of FIG. 3A along line 3B-3B.

The first annular stator 40A and the second annular stator 40B are generally of a channel shape in cross-section (FIG. 3B) such that the respective masses MA1, MA2 and MB1, MB2 are guided therein as well as are retained therein when the electro-magnets 52A, 52B are unpowered. That is, the first annular stator 40A and the second annular stator 40B are shaped to retain the masses MA1, MA2, MB1, MB2 when centrifugal force is unavailable.

Although only a single mass (e.g., mass MA1) will be described in detail herein, it should be understood that each of the masses MA1, MA2, MB1, MB2 may be generally alike in configuration. Furthermore, each of the masses MA1, MA2 and MB1, MB2 provide the desired xP suppression by providing a particular mass—here the masses MA1, MA2 may weigh approximately one pound (1 lb.), while the masses MB1, MB2 may weigh approximately two and one half pounds (2.5 lbs.) for stators 40A, 40B with a radius of approximately one foot. It should be understood that these dimensions are for example only and various arrangements may be provided in accordance with the present disclosure.

Figure 3C:
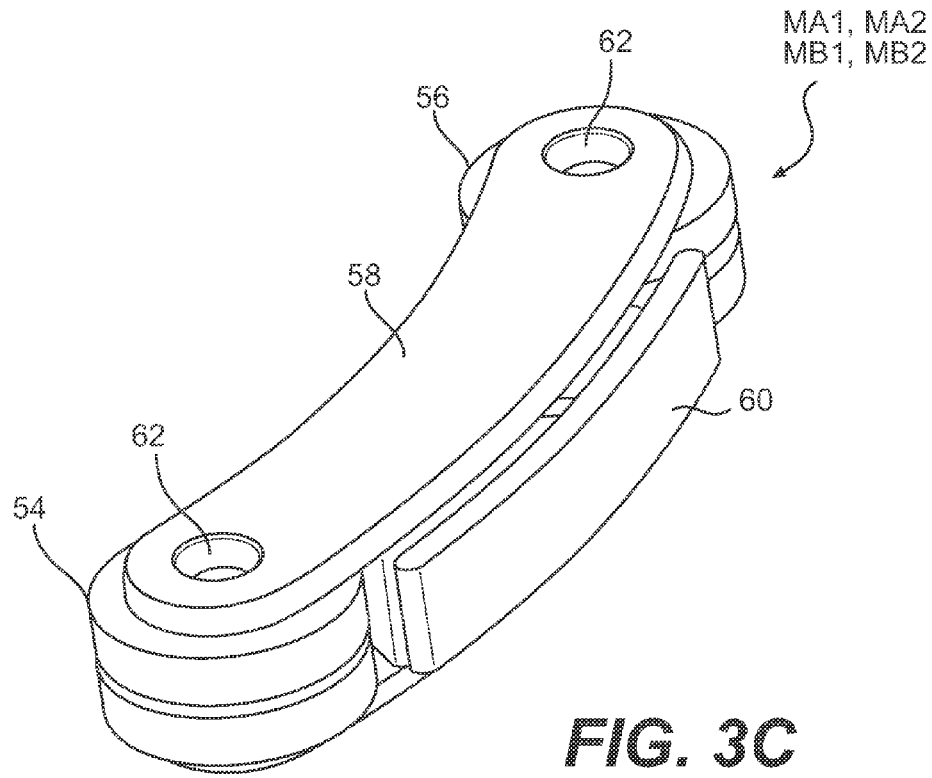
FIG. 3C is an expanded perspective view of a single mass which rotates upon an annular stator.

Referring to FIG. 3C, each of the masses MA1, MA2, MB1, MB2 in this non-limiting embodiment generally include a first wheel 54, a second wheel 56, a truck 58 which supports the wheels 54, 56 and a conductor 60 (FIG. 3C). The conductor 60 may be poles (permanent magnets) for a brushless electric motor embodiment or a conductive element for an inductive motor embodiment. Bearings 62 or the like may be utilized to support the wheels 54, 56 on the truck 58. Each truck 58 represents an independent secondary analogous to the moving part of a linear electric motor.

The truck 58 and/or the conductor 60 may provide the majority of the mass to provide the required anti-vibration forces. Furthermore, either or both of the wheels 54, 56 may be utilized to carry the majority of the mass. For the non-limited embodiment where low bearing loads in the truck 58 are desired, either or both of the wheels 54, 56 may operate as the conductor, i.e. no separate conductive plate type conductor 60 need be provided on the truck 58. The other wheel 56, 54 may thereby carry the majority of the mass. That is, one wheel 54 is relatively light in weight and conductive to provide propulsion, while the other wheel 56 of the same truck 58 is heavy in weight to define the eccentric mass.

Figure 4A:
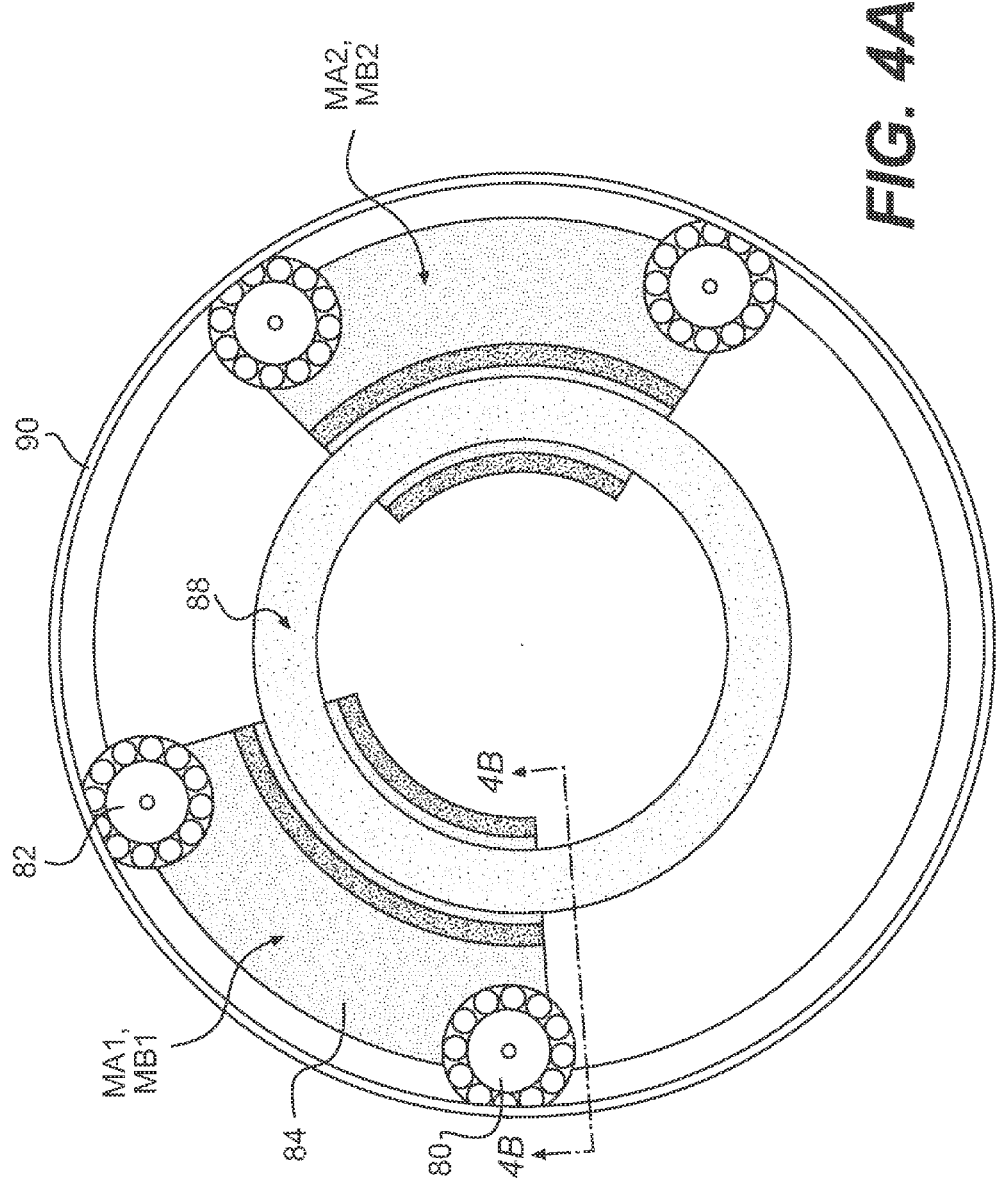
FIG. 4A is a top view of another non-limiting embodiment of a vibration suppressor system.
Figure 4B:
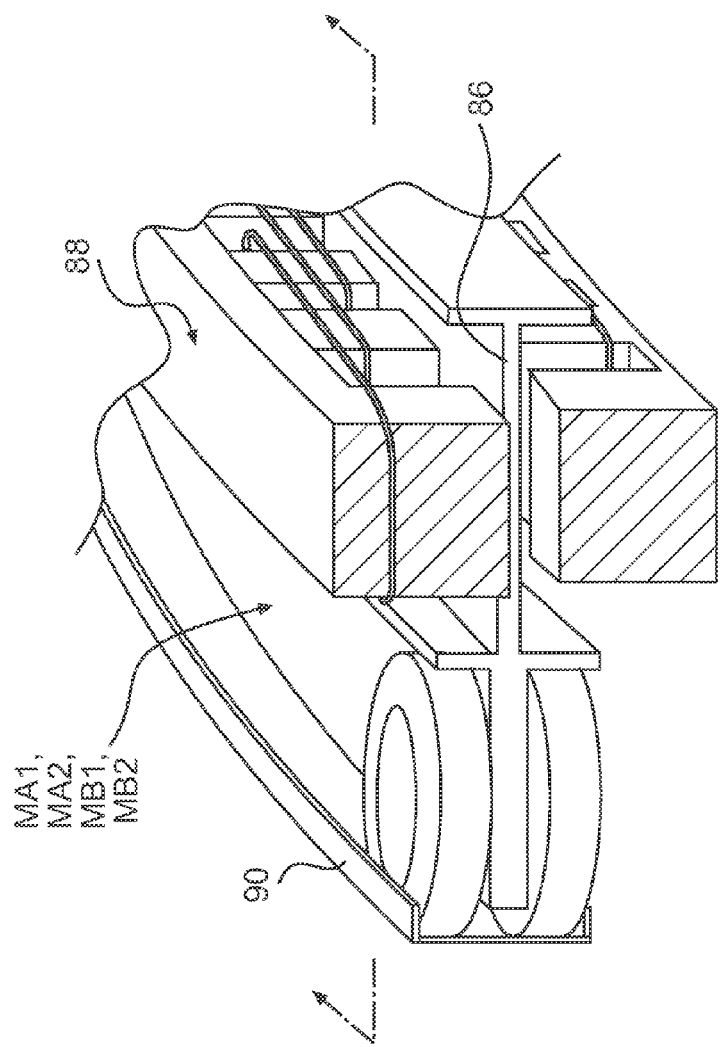
FIG. 4B is a cross-sectional view taken along line 4B-4B in FIG. 4A.

Referring to FIG. 4A, each of the masses MA1, MA2, MB1, MB2 in this non-limiting embodiment includes a first wheel 80, a second wheel 82 and a truck 84 which supports the wheels 80, 82 with a radial-oriented conductor 86 (FIG. 4B) formed in part by the truck 84. At least a portion of the truck 84 forms the conductor 86 which is acted upon by a stator 88. Each stator 88 represents a primary analogous to a fixed portion of a linear electric motor. The stator 88 in this non-limiting embodiment is a wire wound slotted and laminated iron component.

Figure 4C:
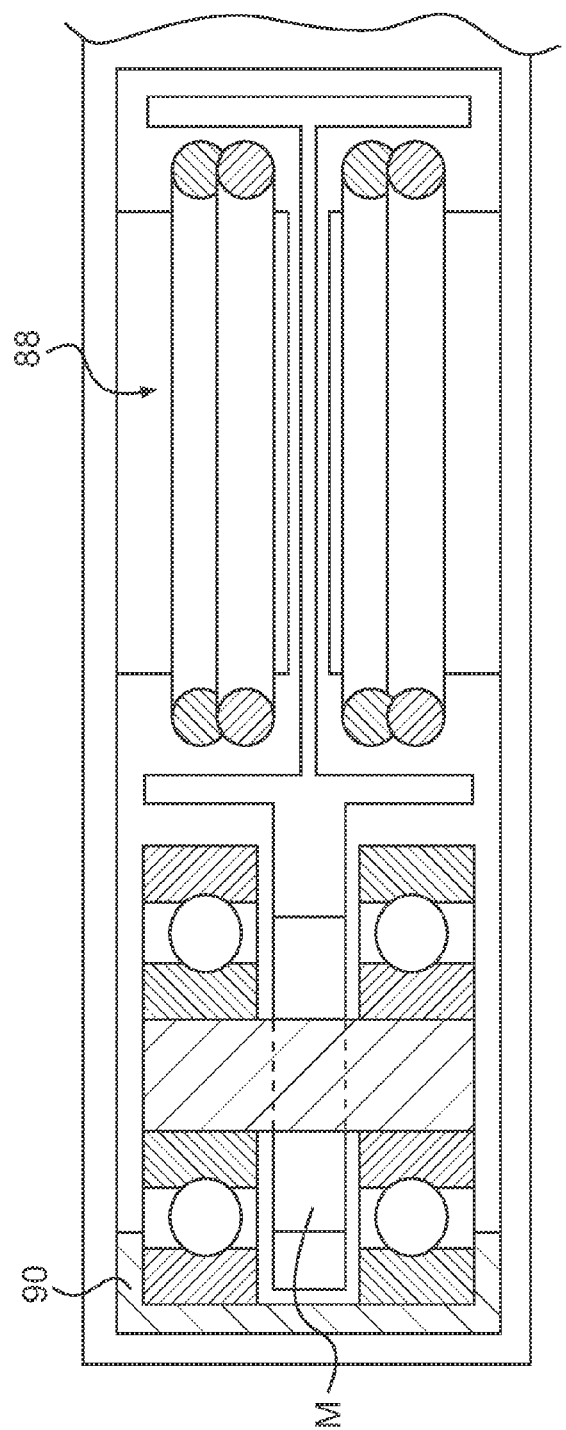
FIG. 4C is a cross-sectional view taken along line 4C-4C in FIG. 4B.

Each of the masses MA1, MA2, MB1, MB2 represents the independent secondary analogous to the moving part of a linear electric motor. The conductor 86 may be manufactured of a conductive material such as copper or aluminum. In this non-limiting embodiment, the conductor 86 is oriented to be in-plane with the plane formed by the primary stator 88 such that the wheels 80, 82 need not provide propulsion. The wheels 80, 82 ride within an outer guide ring 90 (see FIGS. 4B and 4C). The truck 84 may form and/or include a relatively significant mass M between the wheels 80, 82 (FIG. 4C).

Figure 5A:
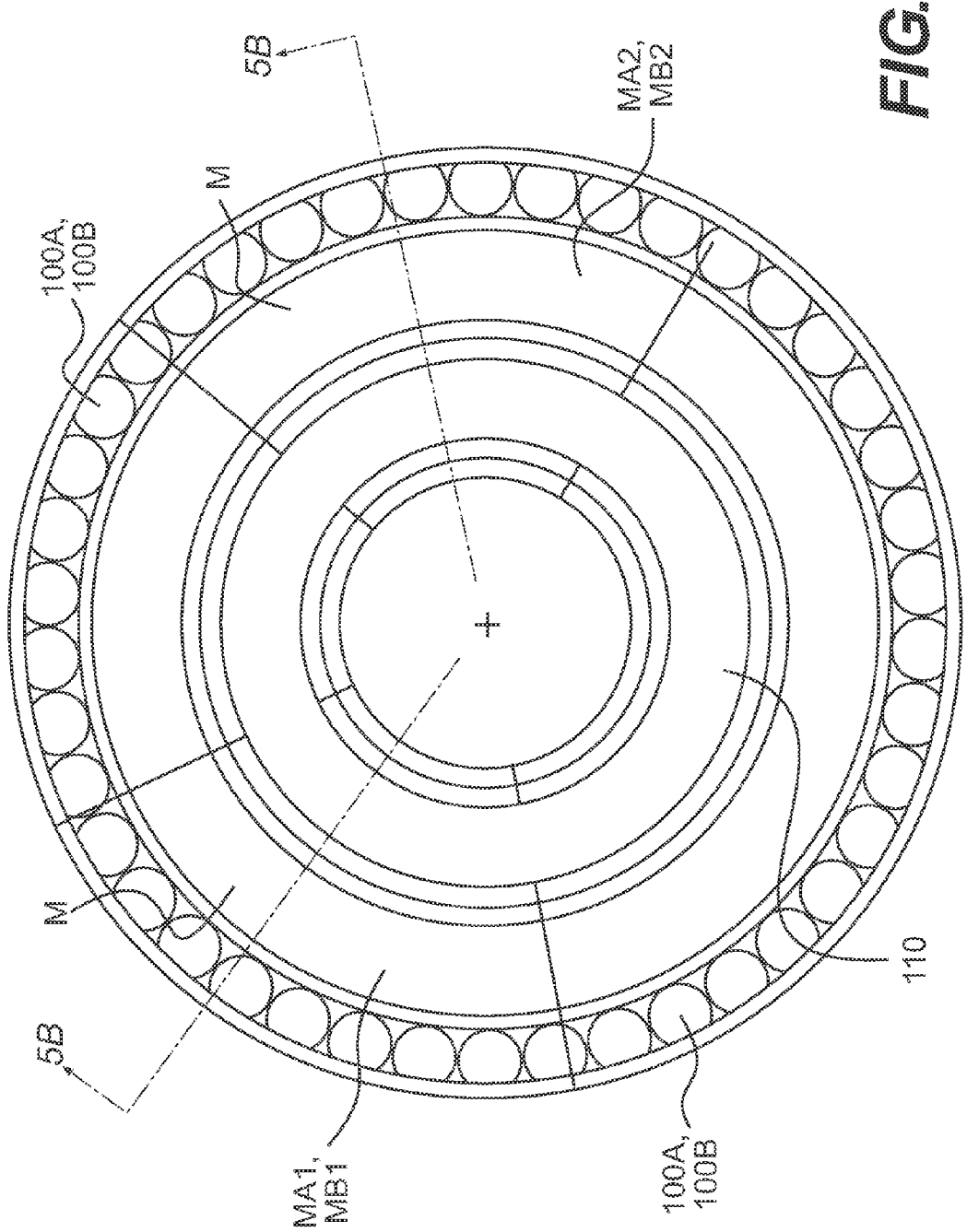
FIG. 5A is another non-limiting embodiment of a vibration suppressor system with ring bearings that support disk-shaped eccentric masses.

Referring to FIG. 5A, each of the masses MA1, MA2, MB1, MB2 in this non-limiting embodiment are supported within an annular bearing 100A, 100B formed within an outer bearing support 102. Each of the masses MA1, MA2, MB1, MB2 in this non-limiting embodiment includes a radial-oriented conductor 104A, 104B formed in part by a truck 106A, 106B. At least a portion of the truck 106A, 106B forms the conductor 104A, 104B which is acted upon by a stator 110 which represents the primary analogous to a fixed portion of a linear electric motor.

Figure 5B:
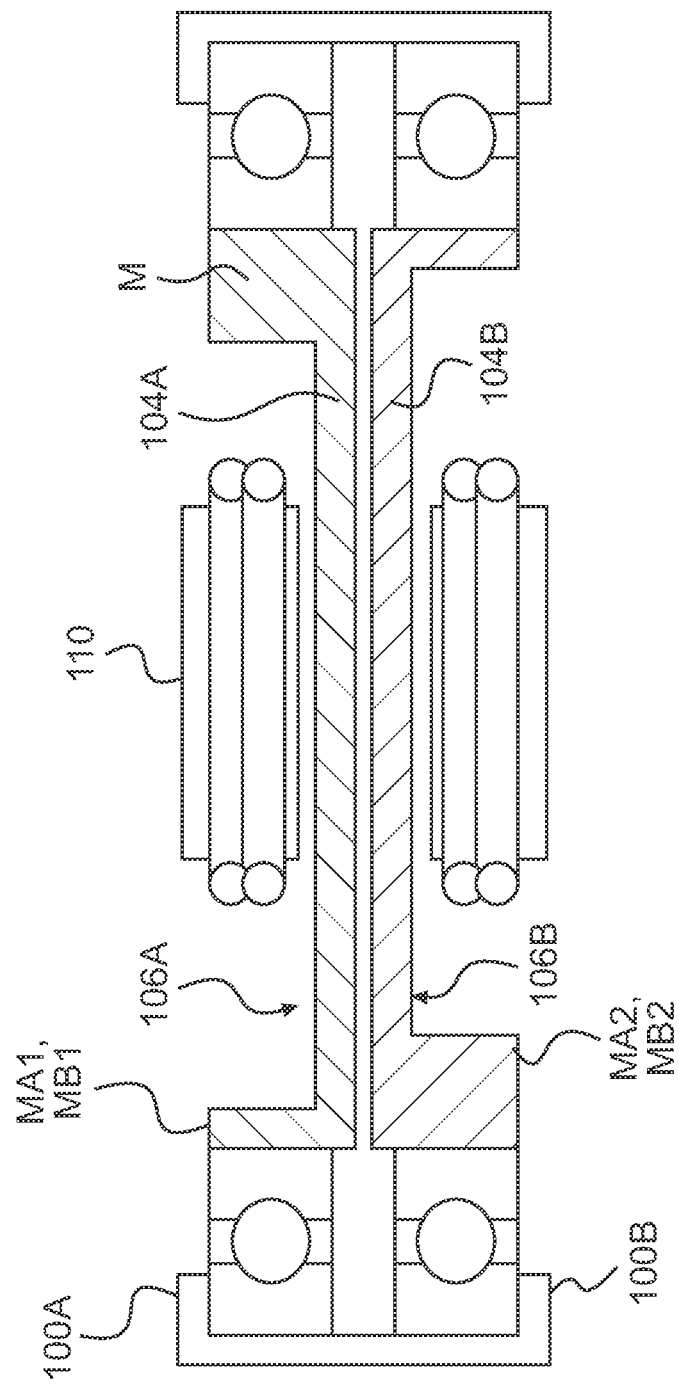
FIG. 5B is a cross-sectional view taken along line 5B-5B in FIG. 5A.

Each truck 106A, 106B may form a relatively significant eccentric mass M which is supported adjacent the annular bearing 100A, 100B (FIG. 5B). That is, each truck 106A, 106B forms an eccentric mass M which rides within the annular bearing 100A, 100B.

Figure 5C:
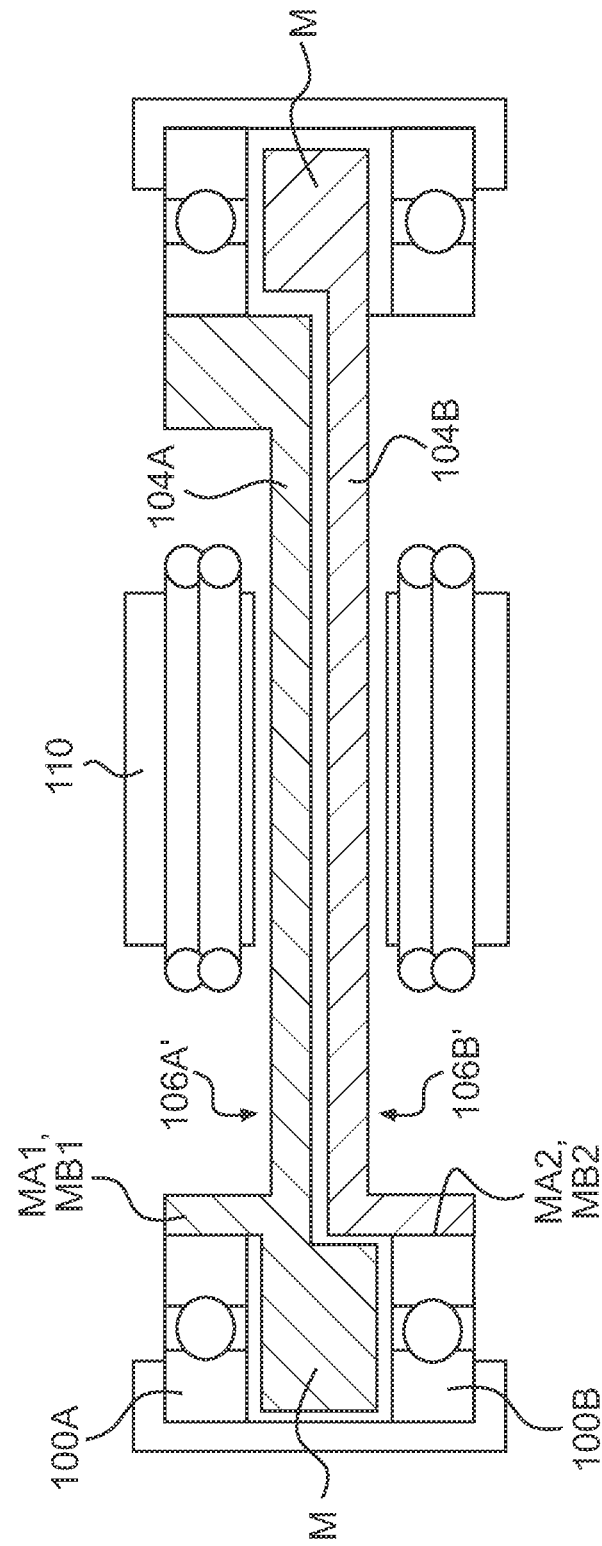
FIG. 5C is a cross-sectional view taken along line 5B-5B in FIG. 5A of another non-limiting embodiment that radially compresses the vibration suppressor system by location of eccentric masses between the two ring bearings.

Alternatively, each truck 106A', 106B' forms an eccentric mass M which is arranged between the annular bearing 100A, 100B (FIG. 5C). This arrangement locates the eccentric mass M in a more radial outboard position which facilitates a lighter weight mass for an equivalent diameter annular bearing 100A, 100B.

Figure 6B:
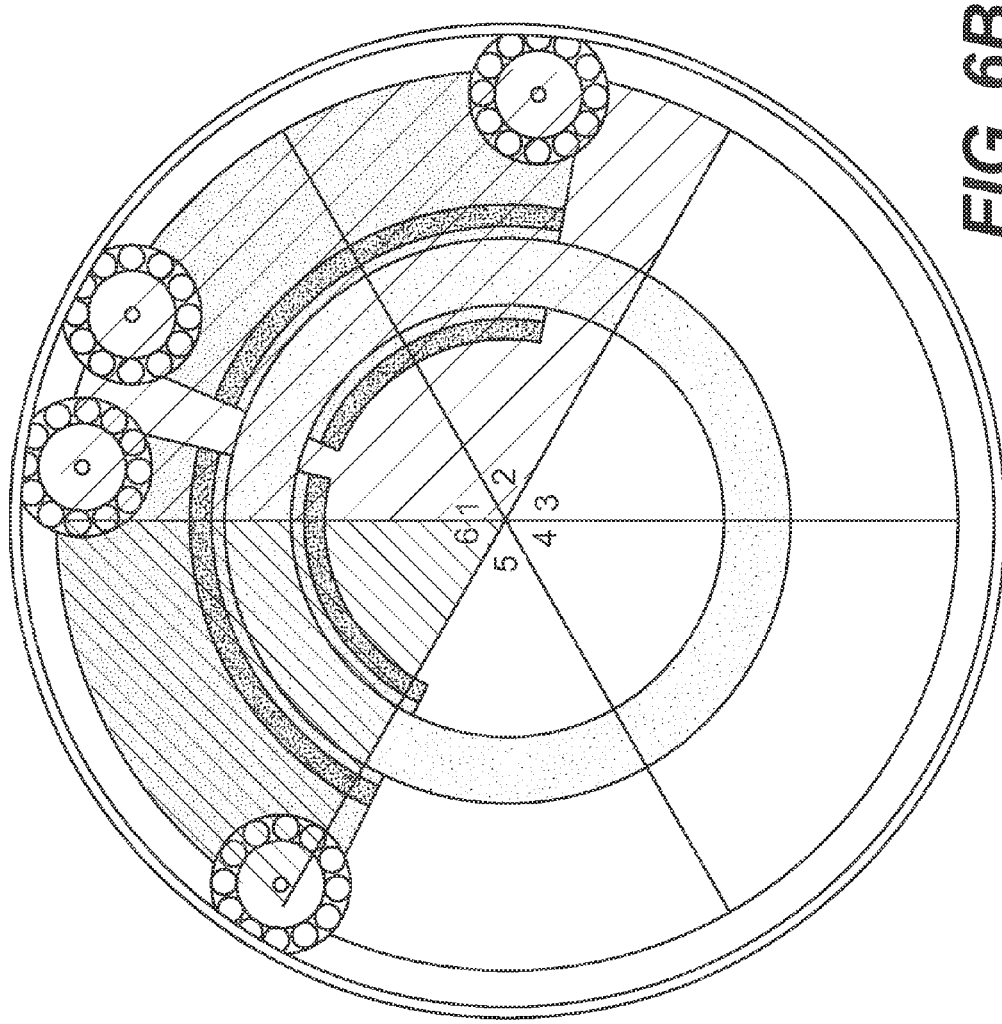
Figure 6D:
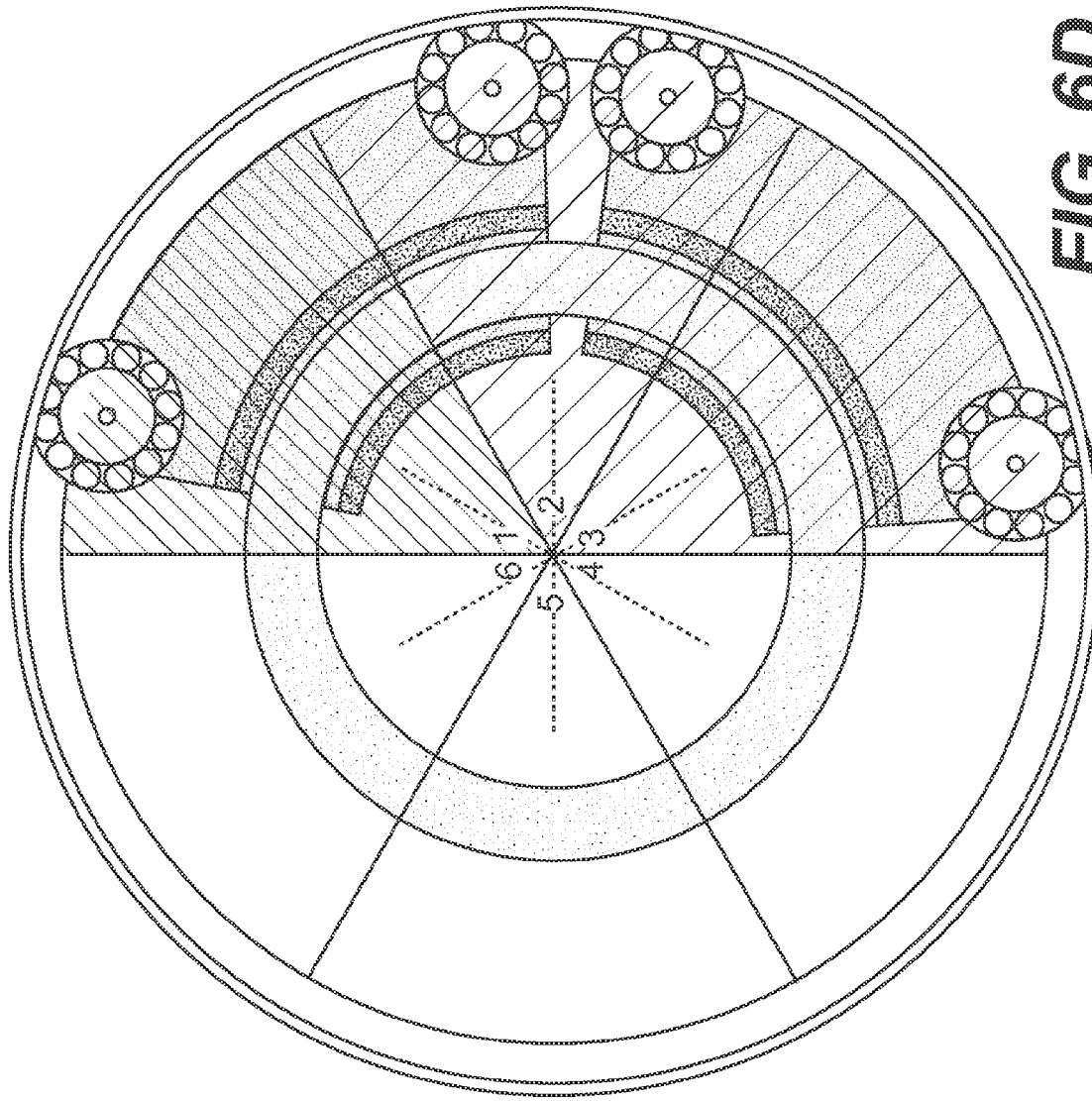
Figure 6E:
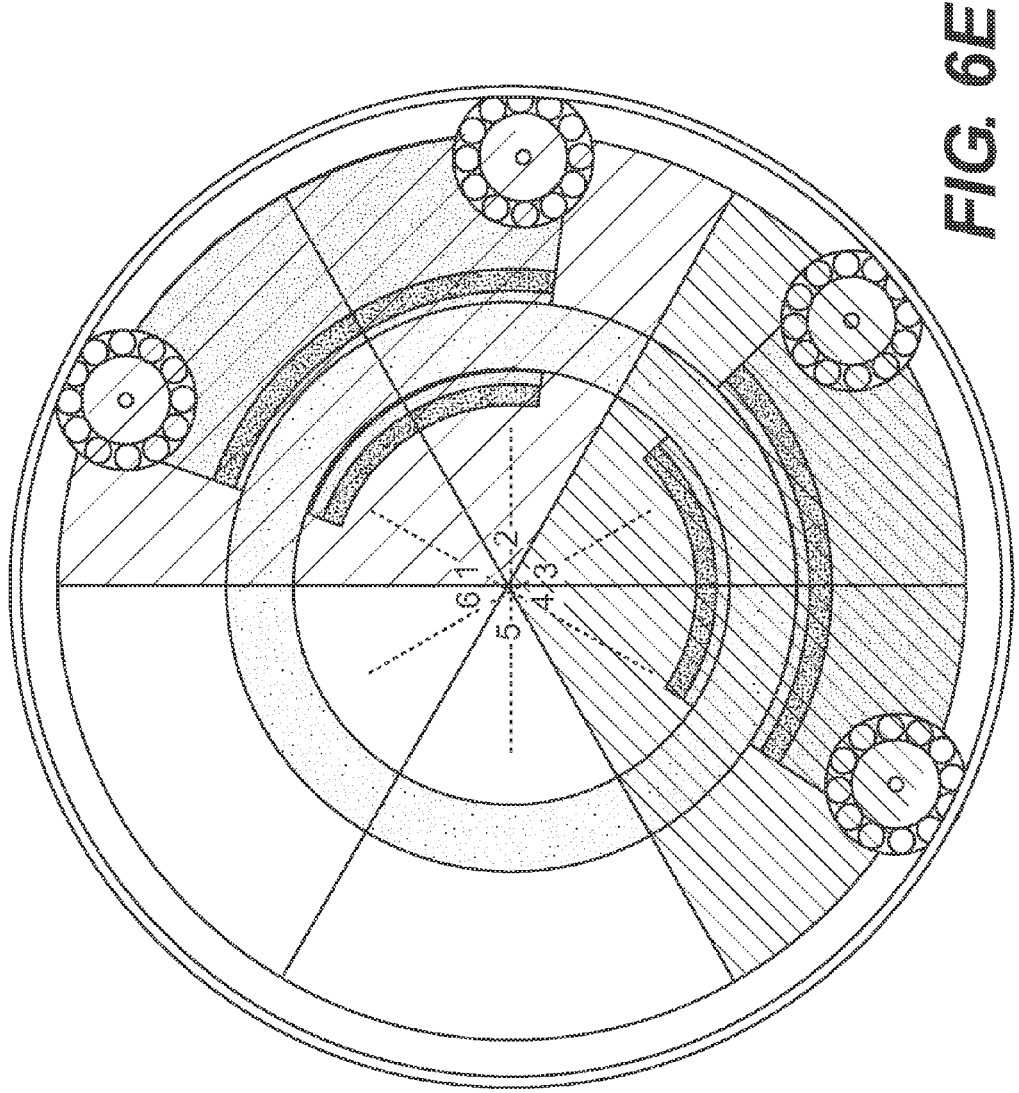

Referring to FIG. 6A, the two individual masses MA1, MA2 located on the first annular stator 40A and the two individual masses MB1, MB2 located on the second annular stator 40B (not shown) are independent controlled through primary sector power transmission. The sixty degree (60°) primary sectors in FIGS. 6A-6E facilitate the minimization of electronic components required to independently control the motion of each of the masses MA1, MA2 and MB1, MB2. Although only the first annular stator 40A with masses MA1, MA2 will be described in the examples herein, it should be understood that each of the two individual masses MB1, MB2 located on the second annular stator 40B—or additional annular stators—are generally alike in configuration and operation.

The primary sectors are independently commanded when only one mass MA1, MB1 overlap that primary sector. In this way, one secondary mass MA1 is driven relative to the other mass MA2.

In the examples illustrated in FIGS. 6A-6E masses MA1, MA2 are close together; thus a large anti-vibration force is produced. At this instant the primary sector 1 propels mass MA2 and the primary sector 6 propels mass MA2 thus independently regulating the velocities of masses MA1, MA2. As the two masses MA1, MA2 move clockwise, their dimension precludes both masses MA1, MA2 from occupying the same primary sector at the same time. Notice on subsequent Figures, that MAR2 departs sector 2 before MA1 enters sector 2. This permits independent control of the motions of masses MA1, MA2. Notice that MA1 and MA2 can of any dimension since the positions of masses MA1, MA2 may be tracked with a sensor system and can not be entirely within the same primary sector at the same time.

As the masses MA1, MA2 move around the first annular stator 40A, the primary sectors which are at the same azimuth as the respective masses MA1, MA2 are selectively powered to control the respective masses MA1, MA2.

On occasion one of the masses MA1, MA2 may abridge two primary sectors (FIGS. 6B-6E) such that two primary sectors are powered and commanded to control the motion.

Figure 7A:
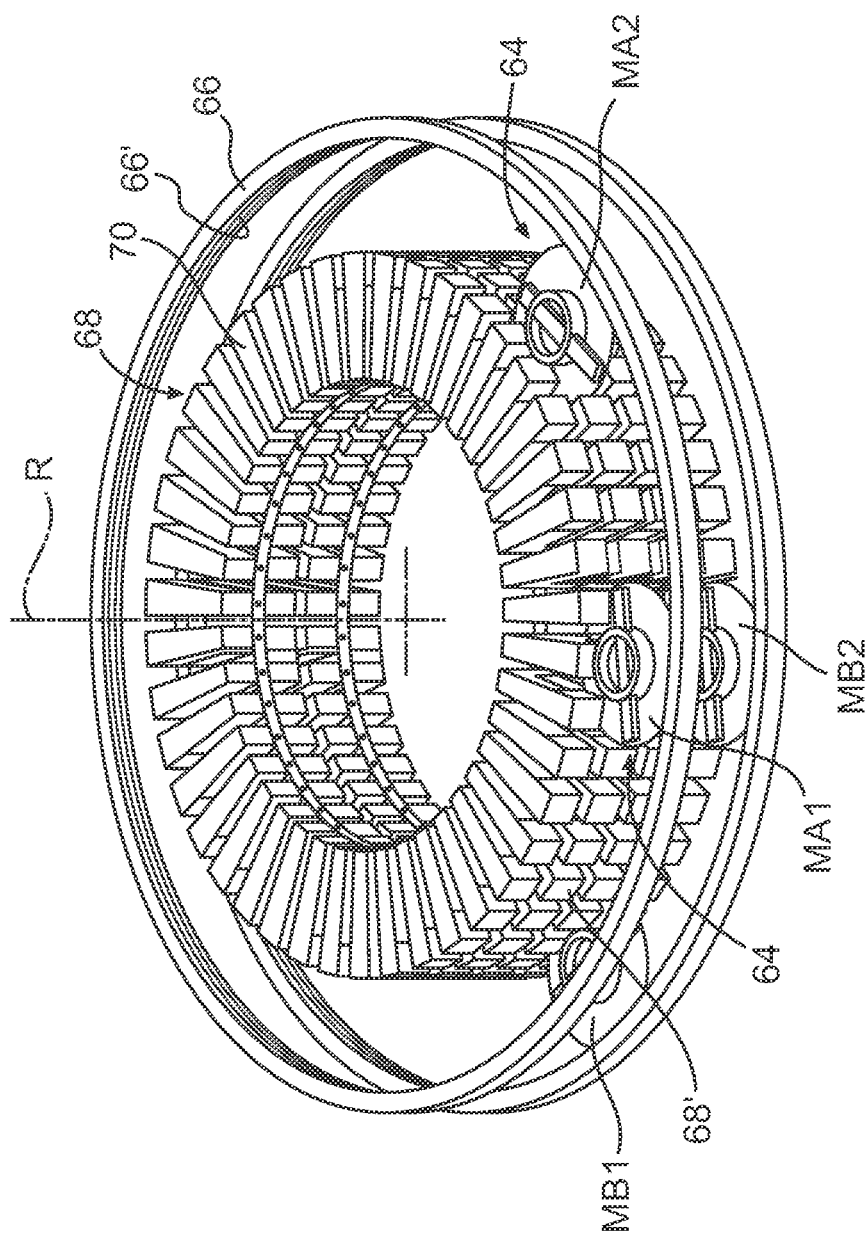
FIG. 7A is another embodiment of the vibration suppressor system having electromagnets arranged around an inner ring.
Figure 7B:
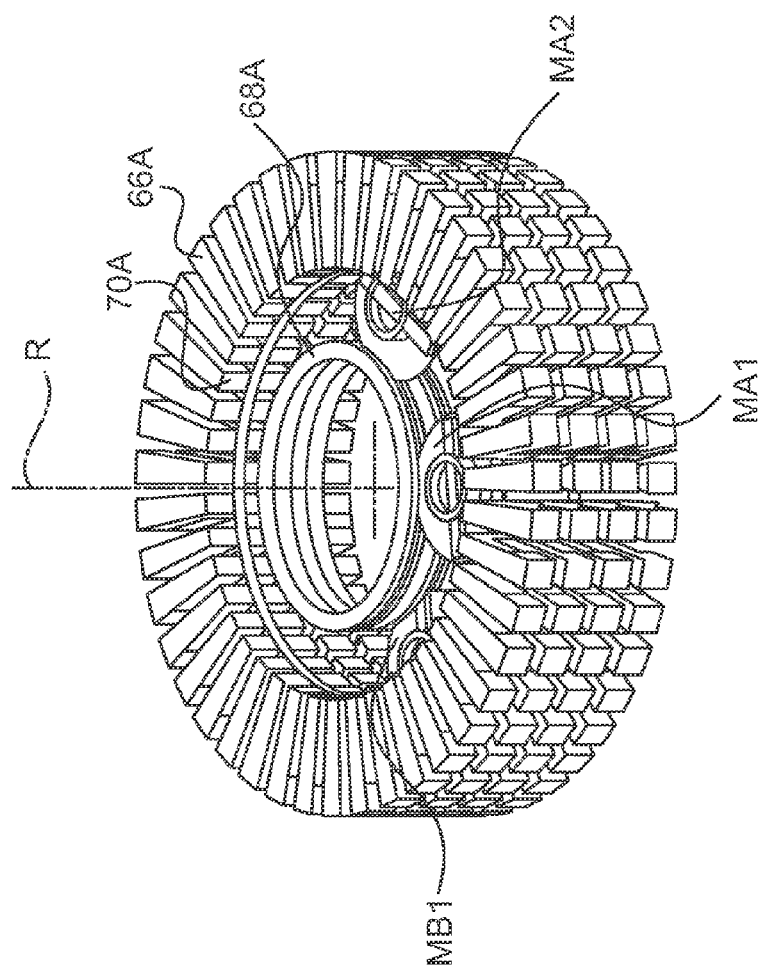
FIG. 7B is a top view of another vibrating suppressor system having electromagnets arranged around an outer ring.

Referring to FIG. 7A, each of the masses MA1, MA2, MB1, MB2 in this non-limiting embodiment generally include an independent wheel 64 in which the wheel 64 itself operates as the mass and the conducting secondary with no truck whatsoever. This eliminates the need for bearings. Each wheel 64 may travel within an outer guide ring 66 and an inner guide ring 68 which define a respective groove 66', 68'. The inner guide ring 68 may be formed of electromagnets 70 which both power each wheel 64 as well as restrains each wheel 64 when not powered. It should be understood that other electro-magnet system arrangement may alternatively or additionally be utilized, e.g., the electro-magnet guide ring 70A may be the outer ring 66A (FIG. 7B).

In operation, the masses MB1, MB2 (FIGS. 8A-8C) are propelled by the electro-magnets 52A within the annular stator 40B at a rotational speed greater than the rotational speed of the main rotor system 12 and appropriately positioned to yield a load vector P1 which is equal and opposite to the load vector R1 produced by the main rotor system 12. This counteracting load vector P1 may be interpreted as a vector which attempts to cancel or null the displacement of the main rotor system 12 and rotor shaft 24.

Figure 8A:
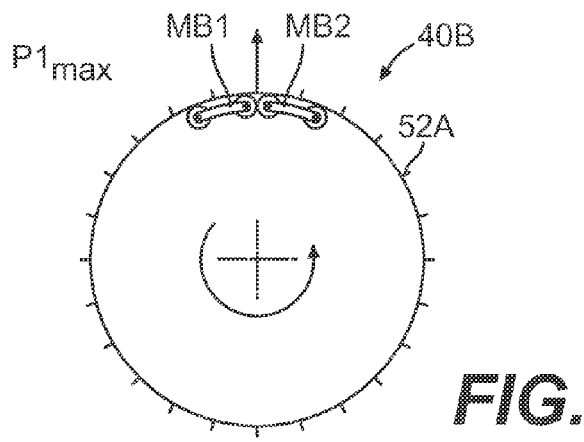
FIG. 8A is a schematic representation of a condition where the maximum force is produced by one annular stator of the vibration suppressor system.
Figure 8B:
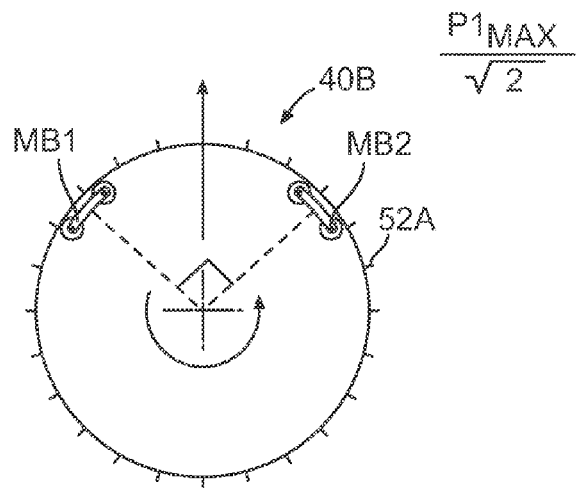
FIG. 8B is a schematic representation of a condition where an intermediate force is produced by one annular stator of the vibration suppressor system.
Figure 8C:
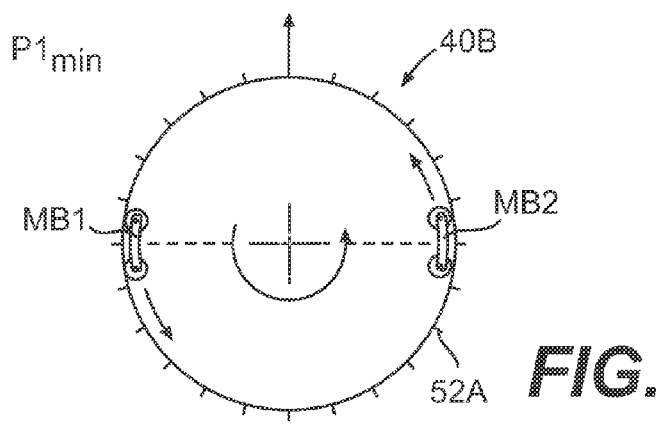
FIG. 8C is a schematic representation of a condition where a minimum force is produced by one annular stator of the vibration suppressor system.

FIGS. 8A-8C depict various operating positions of masses MB1, MB2. Masses MA1, MA2 operate in an analogous manner which therefore need not be described in further detail. The vibration suppressor system 30 controls the rotational speed of the masses MA1, MA2, MB1, MB2 to produce a counteracting load of the correct magnitude and phase to suppress vibrations.

Referring to FIG. 8A, the masses MB1, MB2 are essentially adjacent and act in unison to produce a maximum force vector P1MAX. It should be understood that bumpers or such like may be provided to minimize impact between each mass MB 1, MB2, which may occur during some operational conditions.

Referring to FIG. 8B, the masses MB1, MB2 define a right angle (90 degrees) therebetween thereby producing a force vector P1MAX/(sqrt(2)) that is a fraction of the magnitude of the maximum force vector.

Referring to FIG. 8C, the masses MB1, MB2 are directly opposite (180 degree separation) and are essentially opposing to cancel the vectors produced by each of the masses MB1, MB2 such that essentially zero net force is generated at P1MIN.

The ability to independently vary the relative angular position of the masses is especially valuable in applications wherein the magnitude of the vibratory load active in/on the rotating system varies as a function of operating regime or operating speed. In a rotary-wing aircraft, for example, it is common to require the highest levels of vibration isolation in high speed forward flight i.e., where the rotor blades are experiencing the largest differential in aerodynamic loading from advancing to retreating sides of the rotor system. Consequently, it may be expected that the vibration suppressor system 30 produce the maximum load vector P1MAX (FIG. 8A). In yet another example, it is anticipated that the lowest levels of vibration isolation would occur in a loiter or hovering operating mode, where the rotor blades are exposed to the generally equivalent aerodynamic and gyroscopic affects. Consequently, it may be expected that the vibration suppressor system 30 a minimal load vector P1MIN (FIG. 8C).

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Many modifications and variations of the present disclosure are possible in light of the above teachings. The disclosed embodiments of this disclosure have been disclosed, however, one of ordinary skill in the art would recognize that certain modifications would come within the scope of this disclosure. It is, therefore, to be understood that within the scope of the appended claims, the disclosure may be practiced otherwise than as specifically described. For that reason the following claims should be studied to determine the true scope and content of this disclosure.

What is claimed is:

1. A vibration suppressor system for reducing vibrations in a rotating system, comprising:
   an annular electric motor system provided about an axis of rotation of the rotating system, said annular electric motor system including an annular bearing and a first mass supported within said annular bearing, said first mass guided about said axis of rotation by said annular bearing, wherein said first mass is eccentric, said first mass including a truck being at least partially conductive, said annular electric motor system further including a stator axially spaced-apart, relative to said axis of rotation, from said truck;
   a control system in communication with said annular electric motor system to control rotation of said first mass about said axis of rotation to reduce in-plane vibration of the rotating system;
   wherein a second mass is supported within said annular bearing, and wherein said second mass is eccentric; and
   wherein said control system independently controls rotation of said first and second masses about said axis of rotation.

2. The system as recited in claim 1, wherein said first and second masses each include an eccentric mass positioned between said annular bearing.

3. The system as recited in claim 1, wherein said first and second masses are configured to rotate about said axis of rotation, and wherein a majority of the mass of each of said first and second masses is radially disposed on one side of said axis of rotation.

4. The system as recited in claim 1, wherein said first and second masses each include trucks, and wherein said trucks are eccentric.

5. The system as recited in claim 1, further comprising:
   a rotor system having an N number of blades which rotates about an axis of rotation at a rotational speed of 1P, such that said rotor system produces NP vibrations;
   a sensor system which senses the NP vibrations; and
   wherein said control system is in communication with said sensor system, said control system operable to identify variations of the NP vibrations to control an angular velocity of each of said first mass and said second mass to reduce the NP in-plane rotor system vibrations.

6. The system as recited in claim 5, further comprising a generator driven by said rotor system.

7. The system as recited in claim 6, wherein a phase of the voltage from said generator provides a phase reference to said control system indicative of a rotational speed of said rotor system.

8. The system as recited in claim 1, wherein said axis of rotation intersects said first mass.

9. A vibration suppressor system for reducing vibrations in a rotating system, comprising:
   an annular electric motor system provided about an axis of rotation of the rotating system, said annular electric motor system including an annular bearing and a first mass supported within said annular bearing, said first mass guided about said axis of rotation by said annular bearing, wherein said first mass is eccentric, and wherein said axis of rotation intersects said first mass; and
   a control system in communication with said annular electric motor system to control rotation of said first mass about said axis of rotation to reduce in-plane vibration of the rotating system;
   wherein a second mass is supported within said annular bearing, wherein said second mass is eccentric, and wherein said axis of rotation intersects said second mass; and
   wherein said control system independently controls rotation of said first and second masses about said axis of rotation.

10. The system as recited in claim 9, wherein said first and second masses each include trucks, and wherein said trucks are eccentric.

11. The system as recited in claim 10, wherein said axis of rotation intersects said trucks.

12. A vibration suppressor system for reducing vibrations in a rotating system, comprising:
   an annular electric motor system provided about an axis of rotation of the rotating system, said annular electric motor system including an annular bearing and first and second masses supported within said annular bearing, said first and second masses guided about said axis of rotation by said annular bearing, wherein said first and second masses are eccentric, said first and second masses each including a truck which is at least partially conductive, said annular electric motor system further including at least one stator axially spaced-apart, relative to said axis of rotation, from said trucks;
   a control system in communication with said annular electric motor system to control rotation of said first and second masses about said axis of rotation to reduce in-plane vibration of the rotating system; and
   wherein said first and second masses are disk-shaped and each span substantially an entirety of an inner diameter of said annular bearing.

* * * * *